UNITED STATES PATENT OFFICE.

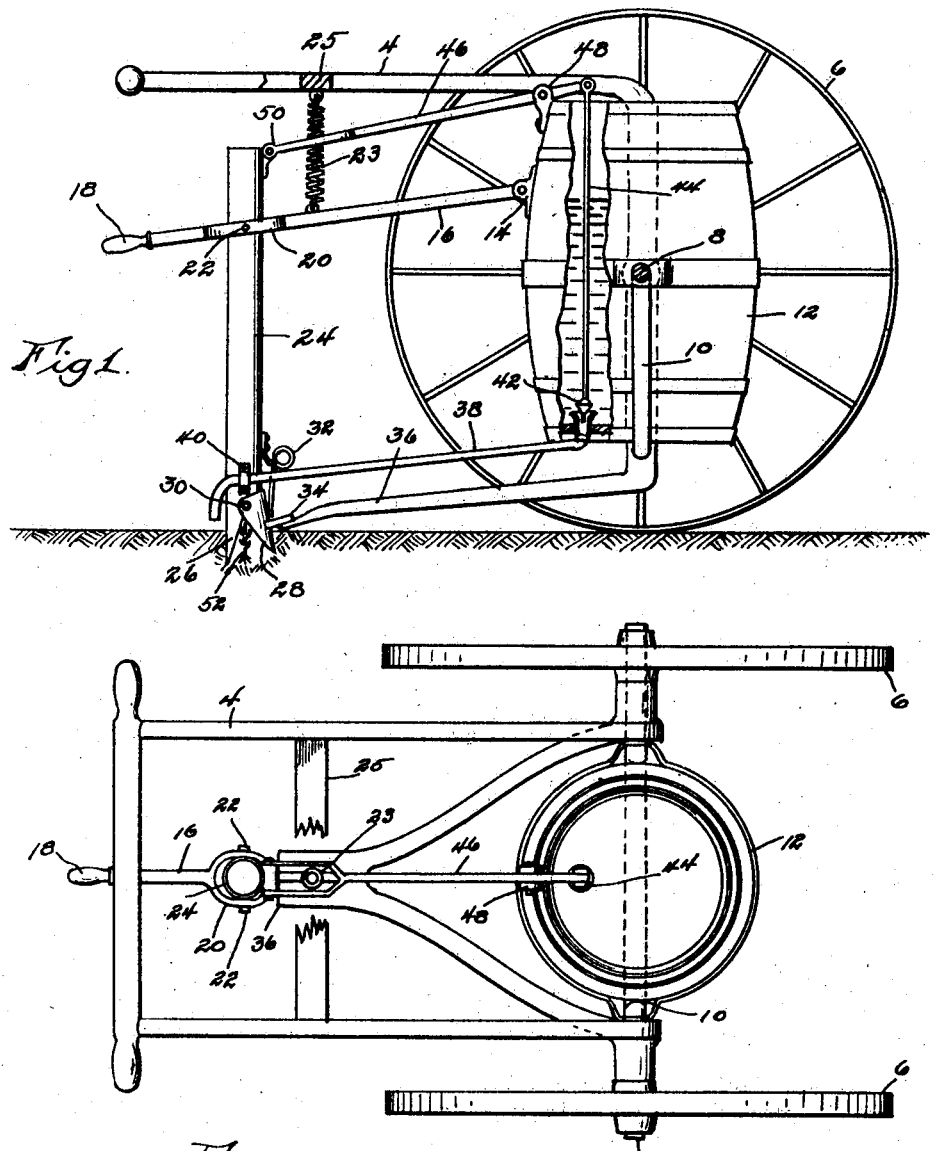

ROBERT LEE PUCKETT, OF FALMOUTH, KENTUCKY.

TRANSPLANTING-MACHINE.

1,333,339.  Specification of Letters Patent.  Patented Mar. 9, 1920.

Application filed April 1, 1919. Serial No. 286,756.

*To all whom it may concern:*

Be it known that I, ROBERT LEE PUCKETT, a citizen of the United States, residing at Falmouth, in the county of Pendleton, State of Kentucky, have invented certain new and useful Improvements in Transplanting-Machines, of which the following is a complete specification.

The present invention relates to transplanting devices, and aims to provide an improved construction of transplanting machine which dispenses with any device for opening a furrow, and employs means for opening the ground at only those points where a plant is to be set or transplanted.

Accordingly I have devised a practical and improved transplanting apparatus which comprises a wheeled supporting frame provided with a movable plant conduit member having ground opening means arranged for automatic operation on lowering of the plant conduit member to open the ground and simultaneously release a plant at whatever points are selected for the setting of the plants.

A further object is to provide a machine having a plant conduit member and ground opening means arranged for operation in the manner stated, together with a watering device also operated automatically by the lowering of the conduit member to feed a suitable quantity of water to the set plant in such a way as not to affect the parts of the ground opening device.

It is further sought to devise an extremely simple apparatus of the character described, having few and uncomplicated parts unlikely to get out of order and adapted to be conveniently and economically operated as well as inexpensive to manufacture.

With these objects in view the invention will now be described with reference to the accompanying drawing illustrating one form of construction which has been devised for embodying the improvements, after which the novel features therein will be set forth in the appended claims.

In the drawing—

Figure 1 is a vertical sectional elevation showing a transplanting machine constructed in accordance with the present invention; and Fig. 2 is a plan view of the same, with a part of the framework broken away.

Referring to the drawing in detail, this illustrates the improved machine as comprising a supporting frame 4 mounted on the axle 6 of wheels 8, the middle portion 10 of which axle is bowed for accommodating and supporting a water tank 12. At the rear of the tank 12 the same is provided with a bracket 14 for fulcruming a lever 16 having an operating handle 18 at its rear end. Intermediate its ends said lever 16 is formed with a yoke portion 20 within which is pivotally mounted by means of pins 22 or the like a plant conduit member 24 comprising a tube of suitable size for receiving the plants at its open upper end and conducting the same to the lower end thereof where said conduit member is provided with ground opening means as hereinafter described. The member 24 with its ground opening means is supported normally in raised position above and out of the ground by means of a coil spring 23 secured to the lever 18 and suspending the same from a transverse bar 25 forming a part of the supporting frame 4.

The ground opening means comprises a fixed ground penetrating element 26 forming a part of the lower end of the conduit member 24, and also a movable ground penetrating element 28 hinged as indicated at 30 to the upper end of the fixed element 26, a spring 32 being arranged to hold said movable element normally in closed relation to said fixed element for the purpose of closing the lower end of the conduit member and at the same time causing said elements 26 and 28 to assume the form of a single penetrating point for entering the ground whenever the conduit member is to be lowered in the transplanting operation.

The movable ground penetrating element 28 is formed with a forwardly projecting finger 34, which extends in position overlying a fixed arm 36 carried by the frame of the machine and projecting rearwardly underneath said finger at approximately the level of the ground surface. This arrangement is such that as the conduit member 24, with its elements 26 and 28, is lowered the said finger 34 is caused to be engaged by the arm 36, whereby further lowering of the conduit member will result in swinging of said element 28 to open position in order to open the ground where the plant is to be set and at the same time release a plant at the point of opening.

The bottom of the tank 12 is provided with a flexible water connection 38 extending rearwardly and provided with a discharge end just to the rear of the fixed ground penetrating element 26, the discharge end of said connection being supported by means of a suitable strap 40 attached to the lower end of the conduit member 24. Associated with the inlet end of said water connection 38 is a valve 42 carried by the lower end of a rod 44, the upper end of which rod is pivotally connected to one end of a lever 46 fulcrumed in a bracket 48 at the top of the tank 12. This lever 46 extends rearwardly and is hingedly connected at 50 to the upper end of the conduit member 24, being provided with a forked rear end for accommodating the supporting spring 23.

In the operation of the machine arranged and constructed as above described, the same is merely pushed along the row where the plants (such as tobacco plants or the like) are to be transplanted, and the conduit member 24 simply lowered as often as a plant is to be set in the ground, these plants being dropped into the upper end of the conduit member as fast as required. The lowering of the said conduit member, by the operation of the lever 16, first causes the ground opening elements 26 and 28 to penetrate the ground while said elements are still in closed relation, whereupon the finger 34 strikes the arm 36 and swings the hinged element 28 open, thus opening the ground at this point, as clearly illustrated in Fig. 1. This of course releases one of the plants 52 which has been dropped into the conduit member ready to be discharged therefrom by the operation just described. The lowering of the conduit member likewise operates simultaneously to open the valve 42 through the medium of the lever 46, whereby a suitable quantity of water is allowed to flow to a point just to the rear of the ground opening elements, which serves to moisten the ground about the newly set plant and in such a way as not to affect the ground opening means, the latter thus continually operating in dry soil and not becoming clogged with mud. As soon as the transplanting action is completed, the operator releases pressure on the lever 16 and the spring 23 restores the conduit member to its original raised position, thereby also closing the valve 42 and permitting the spring 32 to close the movable element 28, the broken soil of course settling back around the plant 52. By this improved construction all work of producing a furrow in the ground is eliminated, the ground being broken only at those points where the plants are set out, and any unevennesses in the ground will not interfere with the progress of the machine since by proper manipulation of the lever 16 the conduit member and connected parts may be lifted up over any ordinary obstructions in the path of the machine.

It will thus be apparent that I have provided an efficient and comparatively simple arrangement and construction for carrying out the desired objects of the invention, and while I have illustrated and described what I now regard as the preferred form of embodiment of the improvements, I desire to expressly reserve the right to make all such formal changes or modifications as may fairly fall within the scope of the appended claims.

Having described the invention, what I claim is:

1. In a transplanting machine, the combination with a supporting frame, of a vertically movable plant conduit member carried by said frame, said member being open at its upper end to permit the insertion of plants therein, ground opening means carried by the lower end of said conduit member, and means operated by the lowering of said conduit member to actuate said ground opening means to open the ground and release a plant.

2. In a transplanting machine, the combination with a supporting frame, of a water tank and a vertically movable plant conduit member carried by said frame, said member being open at its upper end to permit the insertion of plants therein, ground opening means carried by the lower end of said conduit member and provided with a valved water connection to said tank, and means operated by the lowering of said conduit member to actuate said ground opening means to open the ground and release a plant and simultaneously open said water connection.

3. In a transplanting machine, the combination with a supporting frame, of a vertically movable plant conduit member carried by said frame, said member being open at its upper end to permit the insertion of plants therein, ground opening means carried by the lower end of said conduit member, said means comprising fixed and movable ground penetrating elements in normally closed position, and means operated by the lowering of said conduit member to actuate said movable element and thereby spread said ground opening means to open the ground and release a plant.

4. In a transplanting machine, the combination with a supporting frame, of a water tank and a vertically movable plant conduit member carried by said frame, said member being open at its upper end to permit the insertion of plants therein, ground opening means carried by the lower end of said conduit member, said means comprising fixed and movable ground penetrating elements in normally closed position, a valved water connection leading from said tank to the rear of said ground opening means, and means operated by the lowering of said conduit member to open said water connection and simultaneously actuate said movable ground penetrating element and thereby spread said ground opening means to open the ground and release a plant.

5. In a transplanting machine, the combination with a supporting frame, of a vertically movable conduit member carried by said frame, said member being open at its upper end to permit the insertion of plants therein, ground opening means carried by the lower end of said conduit member, said means comprising a fixed ground penetrating element and a movable ground penetrating element provided with a spring for holding said movable element normally in conduit closing relation to said fixed element, and a fixed arm projecting from said frame in position to engage and open said movable element on lowering of said conduit member.

In witness whereof I hereto affix my signature.

ROBERT LEE PUCKETT.